United States Patent
Zhang et al.

(10) Patent No.: US 10,641,709 B2
(45) Date of Patent: May 5, 2020

(54) RAMAN SPECTRUM INSPECTION APPARATUS AND SECURITY MONITORING METHOD FOR RAMAN SPECTRUM INSPECTION APPARATUS

(71) Applicant: Nuctech Company Limited, Beijing (CN)

(72) Inventors: Jianhong Zhang, Beijing (CN); Ankai Wang, Beijing (CN); Hongqiu Wang, Beijing (CN); Rui Fan, Beijing (CN); Huacheng Feng, Beijing (CN)

(73) Assignee: Nuctech Company Limited, Beijing (CN)

( * ) Notice: Subject to any disclaimer, the term of this patent is extended or adjusted under 35 U.S.C. 154(b) by 82 days.

(21) Appl. No.: 15/853,074

(22) Filed: Dec. 22, 2017

(65) Prior Publication Data
US 2018/0180551 A1    Jun. 28, 2018

(30) Foreign Application Priority Data

Dec. 26, 2016 (CN) .......................... 2016 1 1218116
Jan. 20, 2017 (CN) .......................... 2017 1 0042074

(51) Int. Cl.
*G01N 21/65* (2006.01)
*G01J 5/00* (2006.01)
(Continued)

(52) U.S. Cl.
CPC .............. *G01N 21/65* (2013.01); *G01J 3/44* (2013.01); *G01J 3/4412* (2013.01);
(Continued)

(58) Field of Classification Search
CPC ........ G01J 5/0003; G01J 3/4406; G01J 3/4412; G01J 3/44; G01J 3/141; G01N 21/01;
(Continued)

(56) References Cited

U.S. PATENT DOCUMENTS

2007/0236697 A1    10/2007   Zribi et al.
2012/0018829 A1     1/2012   Beck et al.
(Continued)

FOREIGN PATENT DOCUMENTS

CN    102297856 A    12/2011
CN    103868906 A     6/2014
(Continued)

OTHER PUBLICATIONS

"European Application Serial No. 17210668.4, Extended European Search Report dated Feb. 27, 2018", (Feb. 28, 2018), 9 pgs.
(Continued)

*Primary Examiner* — Jamil Ahmed
(74) *Attorney, Agent, or Firm* — Schwegman Lundberg & Woessner, P.A.

(57) ABSTRACT

A Raman spectrum inspection apparatus and a security monitoring method for a Raman spectrum inspection apparatus are provided. The Raman spectrum inspection apparatus includes: a laser device configured to emit an exciting light; an optical device configured to guide the exciting light to an object to be detected and collect a light signal from the object; a spectrometer configured to split the collected light signal to generate a Raman spectrum of the object; and a security detector configured to detect an infrared light emitted from the object.

15 Claims, 4 Drawing Sheets

(51) Int. Cl.
*G01N 21/01* (2006.01)
*G05B 19/4065* (2006.01)
*G01J 3/44* (2006.01)
*G02B 27/14* (2006.01)

(52) U.S. Cl.
CPC ............ *G01J 5/0003* (2013.01); *G01N 21/01* (2013.01); *G05B 19/4065* (2013.01); *G01N 2201/063* (2013.01); *G01N 2201/06113* (2013.01); *G02B 27/141* (2013.01); *G05B 2219/49353* (2013.01)

(58) Field of Classification Search
CPC ... G01N 2201/063; G01N 2201/06113; G05B 19/4065; G02B 27/141
See application file for complete search history.

(56) References Cited

U.S. PATENT DOCUMENTS

| | | |
|---|---|---|
| 2013/0003044 A1 | 1/2013 | Maler et al. |
| 2013/0182247 A1 | 7/2013 | Volodin et al. |
| 2015/0168367 A1* | 6/2015 | Gardner ............... G01N 33/227 356/72 |
| 2015/0204789 A1* | 7/2015 | Akkus .................... G01N 21/65 702/196 |

FOREIGN PATENT DOCUMENTS

| | | |
|---|---|---|
| CN | 104048915 A | 9/2014 |
| CN | 106770176 A | 5/2017 |
| CN | 206479455 U | 9/2017 |
| KR | 20130099600 A | 9/2013 |

OTHER PUBLICATIONS

"U.S. Appl. No. 16/473,192, Preliminary Amendment filed Jun. 24, 2019", 8 pgs.

"International Application Serial No. PCT/CN2017/076658, International Search Report dated May 9, 2018", w/ English Translation, (May 9, 2018), 6 pgs.

"International Application Serial No. PCT/CN2017/076658, Written Opinion dated May 9, 2018", (May 9, 2018), 4 pgs.

* cited by examiner

RAMAN SPECTRUM INSPECTION APPARATUS AND SECURITY MONITORING METHOD FOR RAMAN SPECTRUM INSPECTION APPARATUS

CROSS-REFERENCE TO RELATED APPLICATION

This application claims priority of Chinese Patent Application No. 201611218116.8 filed on Dec. 26, 2016 in the State Intellectual Property Office of China, and Chinese Patent Application No. 201710042074.5 filed on Jan. 20, 2017 in the State Intellectual Property Office of China, the disclosures of which are incorporated herein by reference.

BACKGROUND OF THE DISCLOSURE

Field of the Disclosure

Embodiments of the present disclosure generally relate to the field of Raman spectrum detection, and in particular to a Raman spectrum inspection apparatus and a security monitoring method for a Raman spectrum inspection apparatus.

Description of the Related Art

Raman spectrum analysis technology is one of non-contact spectrum analysis technologies based on Raman scattering effects. It can analyze compositions of substance qualitatively and quantitatively. Raman spectrum is one of molecular vibration spectra. It may reflect fingerprint features of molecules for inspection of substance. The Raman spectrum inspection is a method for inspecting and recognizing substances by detecting Raman spectra produced by the Raman scattering effects of an object to be inspected to an exciting light. The Raman spectrum inspection method has been broadly used in various fields, such as liquid security inspection, gem inspection, explosive inspection, drug inspection, medicine inspection.

In recent years, Raman spectrum analysis technology has been widely applied in fields such as inspection of hazardous articles and recognition of substance. In the field of recognition of substances, the people often cannot judge properties of the substances correctly as various substances have different colors and shapes. The Raman spectrum depends on level structure of molecules of the object to be detected, thus, the Raman spectrum may be used as "fingerprint" information of substances for recognizing substances. Therefore, the Raman spectrum analysis technology has been applied broadly in fields of such as customs, common security, foods, drugs, environments.

SUMMARY OF THE DISCLOSURE

An embodiment of the present disclosure provides a Raman spectrum inspection apparatus, including:
a laser device configured to emit an exciting light;
an optical device configured to guide the exciting light to an object to be detected and collect a light signal from the object;
a spectrometer configured to split the collected light signal to generate a Raman spectrum of the object; and
a security detector configured to detect an infrared light emitted from the object.

An embodiment of the present disclosure provides a security monitoring method for a Raman spectrum inspection apparatus, including:
emitting an exciting light by a laser device;
guiding the exciting light to an object to be detected and collecting a Raman scattering light signal from the object; and
detecting radiation energy of an infrared light emitted from the object by a security detector to monitor temperature of the object.

BRIEF DESCRIPTION OF THE DRAWINGS

In order that the present disclosure can be understood better, embodiments of the present disclosure will be described below with reference to the following drawings.

Not all circuits or structures of the embodiments are shown in Figures. Same reference numerals represent same or similar components or features throughout all of Figures.

DETAILED DESCRIPTION OF THE EMBODIMENTS

Figure 1:
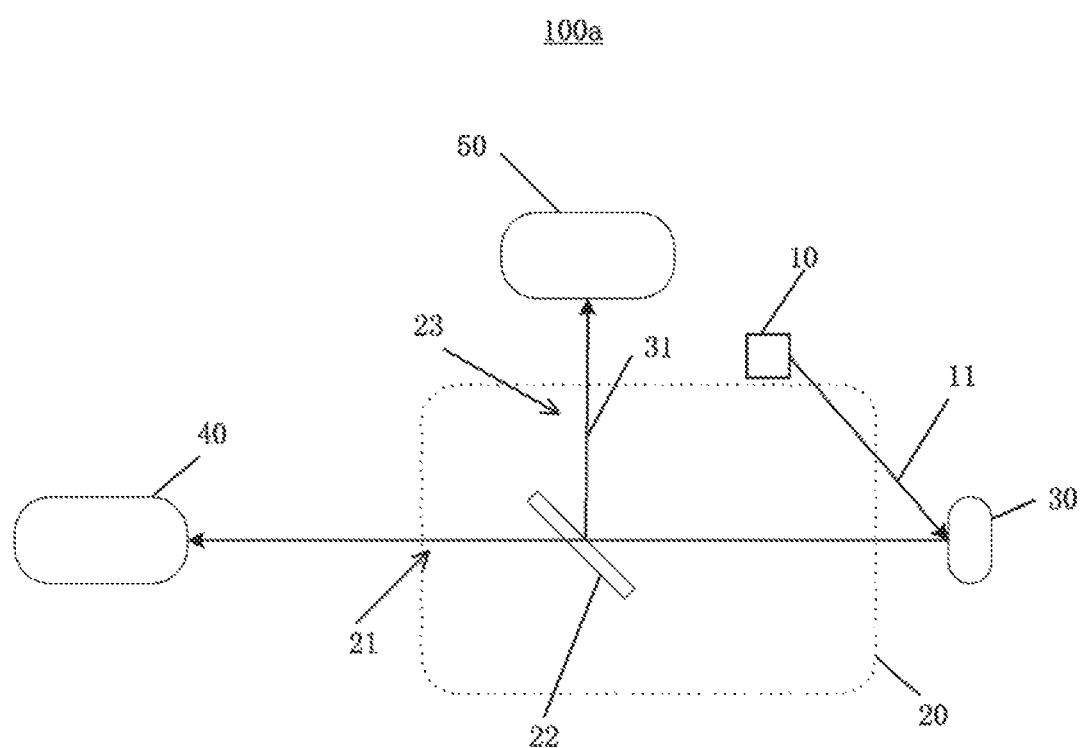
FIG. 1 is a schematic view showing a Raman spectrum inspection apparatus according to an embodiment of the present disclosure.

Technical solutions of the present disclosure will be described hereinafter in more detail by the way of embodiments with reference to the attached drawings. The same or similar reference numerals refer to the same or similar elements throughout the description. The explanation to the embodiments of the present disclosure with reference to the attached drawings is intended to interpret the general concept of the present disclosure, rather than being construed as a limiting to the present disclosure.

In accordance with a general concept of the present disclosure, it provides a Raman spectrum inspection apparatus including: a laser device configured to emit an exciting light; an optical device configured to guide the exciting light to an object to be detected and collect a light signal from the object; a spectrometer configured to split the collected light signal to generate a Raman spectrum of the object; and a security detector configured to detect an infrared light emitted from the object.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic view showing a structure of the Raman spectrum inspection apparatus 100a according to an embodiment of the present disclosure. The Raman spectrum inspection apparatus 100a includes a laser device 10 configured to emit an exciting light 11; an optical device 20 configured to guide the exciting light 11 to the object 30 to be detected and collect a light signal from the object 30; a spectrometer 40 configured to split the collected light signal to generate Raman spectrum of the object 30; and a security detector 50 configured to detect an infrared light 31 emitted from the object 30. As an example, the Raman spectrum of the object 30 generated by the spectrometer 40 may be compared with the Raman spectra of the known substances to determine the composition of the object 30. The comparing may be implemented for example by a computer or a processor.

During the Raman inspection, security accident may occur typically due to temperature rise caused by heat absorption of sample and thereby ablation, even ignition and explosion phenomenon of the object. In the embodiment of the present disclosure, the security detector 50 (for example, an infrared detector) is used to detect the infrared light 31 emitted by the object 30, so as to monitor the temperature of the object 30, since the radiation energy of the infrared light typically increases as the temperature of the object rises. The variation of temperature of the object 30 can be found by monitoring the radiation energy of the infrared light and then the emission of the laser may be controlled timely, so as to avoid security accident.

Figure 2:
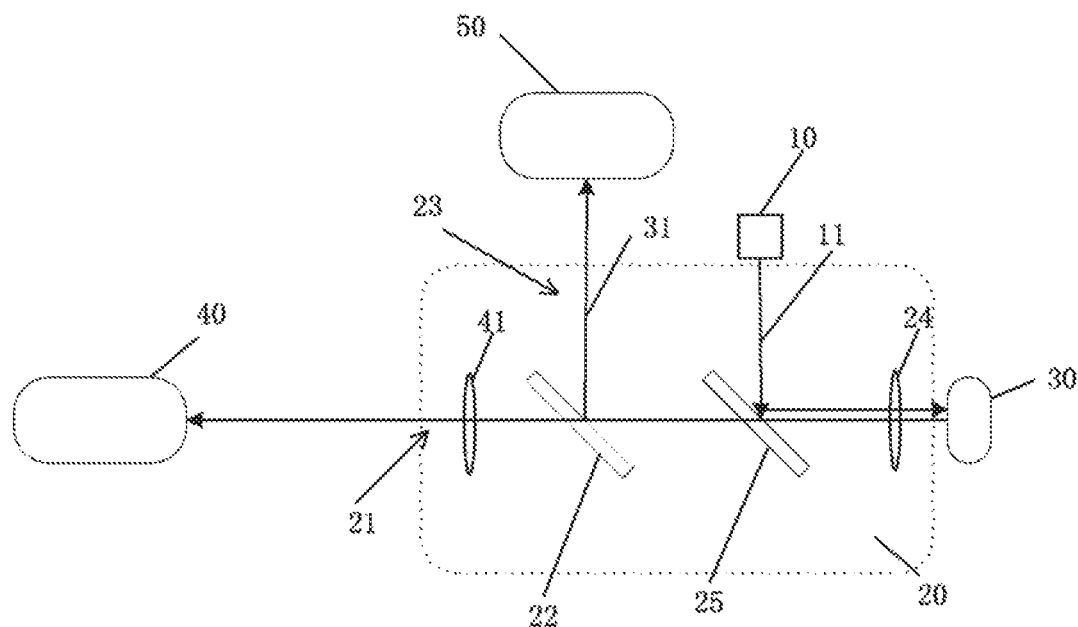
FIG. 2 is a schematic view showing a Raman spectrum inspection apparatus according to another embodiment of the present disclosure.

In an example, as shown in FIG. 2, the optical device 20 may include a Raman scattering light signal collecting optical path 21 configured to collect the Raman scattering light signal from the object 30. A first beam splitter 22 is provided in the Raman scattering light signal collecting optical path 21. The first beam splitter 22 is arranged to form an infrared radiation branch 23 from the Raman scattering light signal collecting optical path 21, to guide the infrared light from the object 30 towards the security detector 50. The first beam splitter 22 can extract the infrared light emitted from the object 30 from the Raman scattering light signal collecting optical path 21, thus it may detect the infrared light while preventing the Raman scattering light signal from being affected to the largest extent. As an example, the first beam splitter 22 may reflect the infrared light in a response waveband of the security detector to the security detector to the largest extent while preventing the Raman scattering light signal (generally in a range of 0-3000 cm$^{-1}$) from being affected as far as possible. Certainly, it may also process the infrared light in the infrared radiation branch 23, such as select waveband of the infrared light, or converge the infrared light, if required.

In the above example, the optical path along which the infrared light travels and the optical path along which the Raman scattering light travels are same at their beginning ends (at the end close to the object 30). The infrared light collected by this way can better exhibit actual temperature of the object 30.

As an example, the first beam splitter 22 is a short pass dichroic beam splitter arranged to reflect a light having a wavelength greater than a predetermined wavelength towards the security detector 50 while transmitting the light having a wavelength less than the predetermined wavelength through the short pass dichroic beam splitter. For example, the predetermined wavelength may be in a range of 700 nanometers to 300 micrometers, for example, between 900 nanometers and 1500 nanometers, for example, the predetermined wavelength may be arranged as 1200 nanometers. However, the predetermined wavelength of the short pass dichroic beam splitter is not limited to this range in the embodiments of the present disclosure. Typically, the wavelength range of the Raman spectrum processed by the spectrometer in the Raman spectrum inspection apparatus is from 550 to 1100 nanometers. The light having the wavelength less than the predetermined wavelength may be transmitted through the short pass dichroic beam splitter (for example, the transmissivity may be 90% or more), which will substantially have no influence on the Raman spectrum inspection. While, the light having the wavelength greater than the predetermined wavelength can be reflected into the infrared radiation branch to be transmitted to the security detector 50. Correspondingly, the infrared light will be received and analyzed by the security detector. A typical response waveband of the security detector may for example be 1500 to 3000 nanometers. However, the embodiments of the present disclosure are not limited to this.

Although the first beam splitter 22 has been described in the above example as the short pass dichroic beam splitter, it is not intended to limit embodiments of the present disclosure. Alternatively, the first beam splitter 22 may be implemented by any other wavelength selection beam splitting components known in the art.

In the embodiment of the present disclosure, the first beam splitter 22 may also for example be implemented by a conventional beam splitter. As an example, the first beam splitter may be arranged to reflect one part of the light towards the security detector while transmitting the other part of the light towards the spectrometer. It may also achieve the signal light collecting function and temperature monitoring function.

In an example, in the exemplified Raman spectrum inspection apparatus 100b shown in FIG. 2, a first converging lens 24, a second converging lens 41 and a second beam splitter 25 may also be provided in the Raman scattering light signal collecting optical path 21. The first converging lens 24 is configured to converge the exciting light 11 to the object 30 and collect a light signal from the object 30. The second converging lens 41 is configured to converge the collected light signal to the spectrometer. The second beam splitter 25 is arranged between the first converging lens 24 and the first beam splitter 22 in the Raman scattering light signal collecting optical path 21 and arranged to reflect the exciting light 11 from the laser device 10 towards the first converging lens 24 and transmit at least a part of the reflected light collected by the first converging lens 24 from the object 30 through the second beam splitter 25 to the first beam splitter 22 or the second converging lens 41. In this example, the part of the optical path along which the exciting light 11 is guided to the object 30 and the part of the Raman scattering light signal collecting optical path 21 between the second beam splitter 25 and the object 30 coincide with each other. In the optical path, the first beam splitter 22 is located downstream of the second beam splitter 25, which may avoid disturbance to the front end of the optical path.

Figure 7:
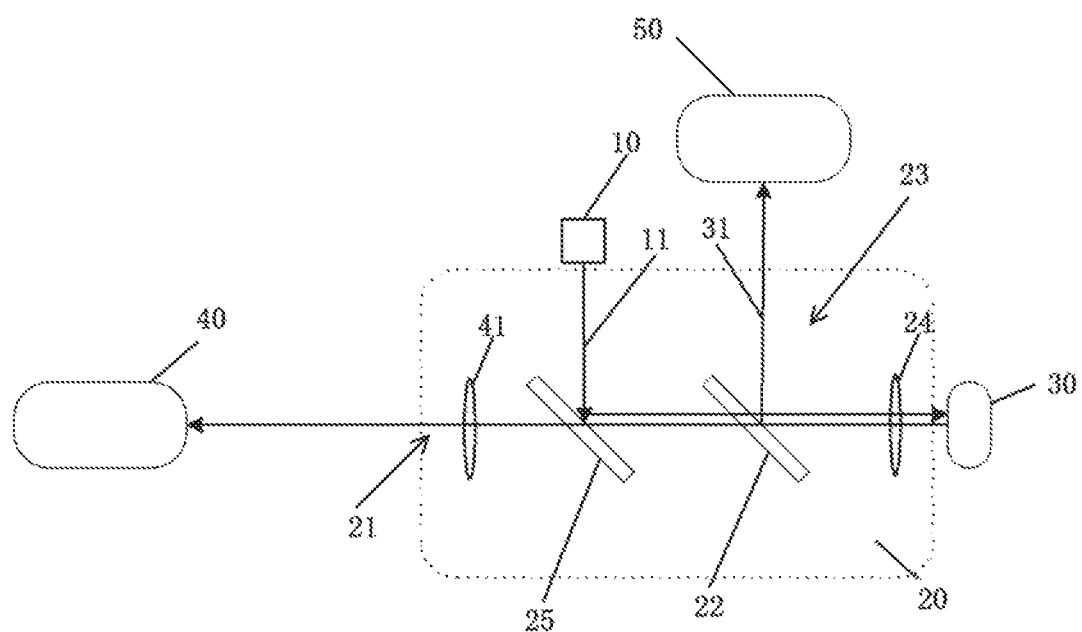
FIG. 7 is a schematic view showing a Raman spectrum inspection apparatus according to a yet still further embodiment of the present disclosure.

As an example, the positions of the first beam splitter 22 and the second beam splitter 25 in FIG. 2 may be exchanged. For example, as shown in FIG. 7, in the Raman spectrum inspection apparatus 100b', the second beam splitter 25 is located between the first beam splitter 22 and the second converging lens 41 in the Raman scattering light signal collecting optical path 21.

As an example, the second beam splitter 25 may be a long pass dichroic beam splitter, that is, it only permits the light having the wavelength greater than a certain threshold to be transmitted through it while blocking the light having the wavelength less than the threshold. It has an advantage of reducing Rayleigh scattering light from the object 30 to be detected. While producing the Raman scattering light, the object 30 often may produce the Rayleigh scattering light which has a wavelength less than that of the Raman scattering light. The threshold of the long pass dichroic beam splitter may be arranged to reduce, even eliminate the Rayleigh scattering light having shorter wavelength, to enhance the signal noise ratio of the Raman scattering light signal. The specific threshold of the long pass dichroic beam splitter may be selected as required in practical measurement. In the embodiment of the present disclosure, the second beam splitter 25 is not limited to the long pass dichroic beam splitter, for example, the second beam splitter 25 may be implemented by any other beam splitting components known in the art.

In an example, in order to better suppress the Rayleigh scattering light, a long pass optical filter or a notch optical filter 26 may also be arranged downstream of the first beam splitter in the Raman scattering light signal collecting optical path 21 and configured to filter out the Rayleigh scattering light in the light signal passing through the first beam splitter. In the embodiments of the present disclosure, it is not intended to limit the position of the long pass optical filter or notch optical filter 26 in the Raman scattering light signal collecting optical path 21, as long as it can serve for removing the Rayleigh scattering light of the light signal in the collecting optical path. For example, the long pass optical filter or notch optical filter 26 may be located upstream of the first beam splitter as a variant to the embodiment shown in FIG. 5, or the long pass optical filter or notch optical filter 26 may also be provided between the first beam splitter and the second beam splitter. In the latter case, the light signal in the collecting optical path may pass through the first converging lens, the second beam splitter, the long pass optical filter or notch optical filter, the first beam splitter, a second converging lens and the spectrometer. Certainly, the embodiments of the present disclosure are not limited to this, for example, no long pass optical filters or notch optical filters may be provided.

Figure 3:
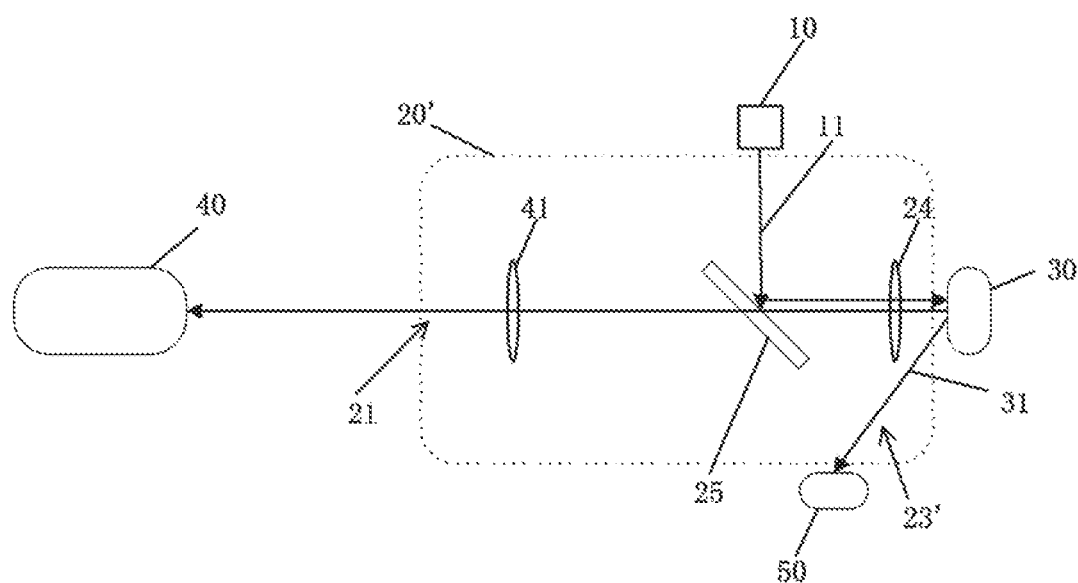
FIG. 3 is a schematic view showing a Raman spectrum inspection apparatus according to a further embodiment of the present disclosure.
Figure 4:
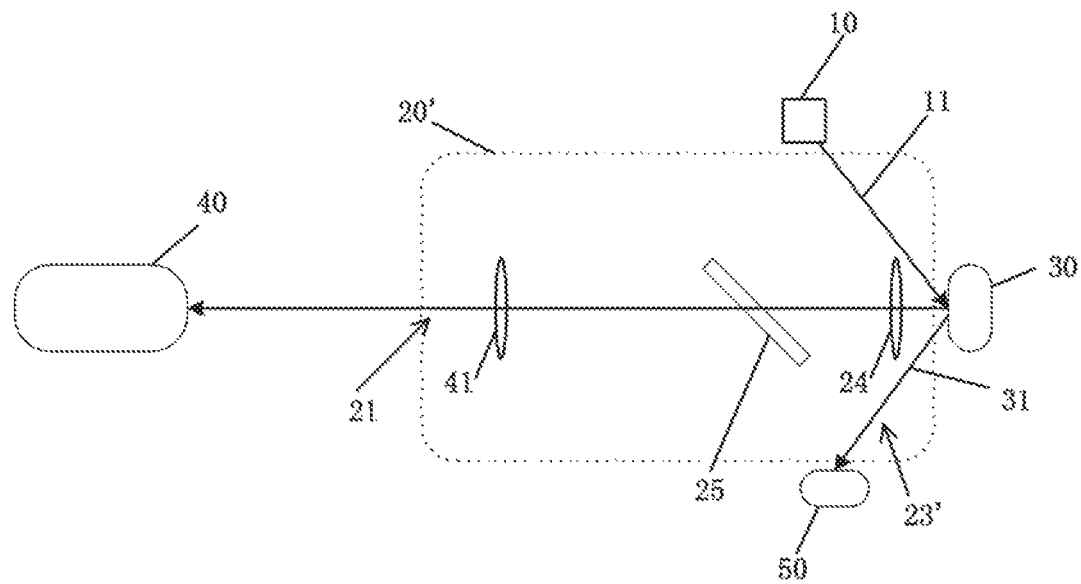
FIG. 4 is a schematic view showing a Raman spectrum inspection apparatus according to a yet further embodiment of the present disclosure.

In another example, as shown in FIG. 3 and FIG. 4, the optical device 20' may further include: a Raman scattering light signal collecting optical path 21 configured to collect the Raman scattering light signal from the object; and an infrared light collecting optical path 23' configured to collect the infrared light from the object 30. In contrast to the infrared radiation branch 23 in the example shown in FIG. 1 and FIG. 2, the infrared light collecting optical path 23' is separated completely from the Raman scattering light signal collecting optical path 21. In this way, the original optical path structure of the Raman spectrum inspection apparatus may be remained as far as possible. The security detector 50 may be arranged at any position close to the object 30 as long as the intensity of the infrared signal may satisfy the detection requirements of the security detector 50.

The exemplified Raman spectrum inspection apparatus 100c shown in FIG. 3 is same as the exemplified Raman spectrum inspection apparatus 100d shown in FIG. 4 except the following structure: in FIG. 3, the part of the optical path along which the exciting light 11 is guided to the object 30 and the part of the Raman scattering light signal collecting optical path 21 between the second beam splitter 25 and the object 30 coincide with each other, while in FIG. 4, the optical path along which the exciting light 11 is guided to the object 30 is separated completely from the Raman scattering light signal collecting optical path 21 (or called as "the exciting light 11 is irradiated off-axis to the object 30 to be detected"). In the example shown in FIG. 4, the second beam splitter 25 is not a necessary element. The example shown in FIG. 4 is only intended to be compared with the example shown in FIG. 3.

In the embodiments shown in FIG. 1 and FIG. 4, as an example, the exciting light may be redirected by some optical elements (such as a reflector) before it is irradiated to the object 30, such that the exciting light can be guided conveniently and correctly to the object 30.

Figure 5:
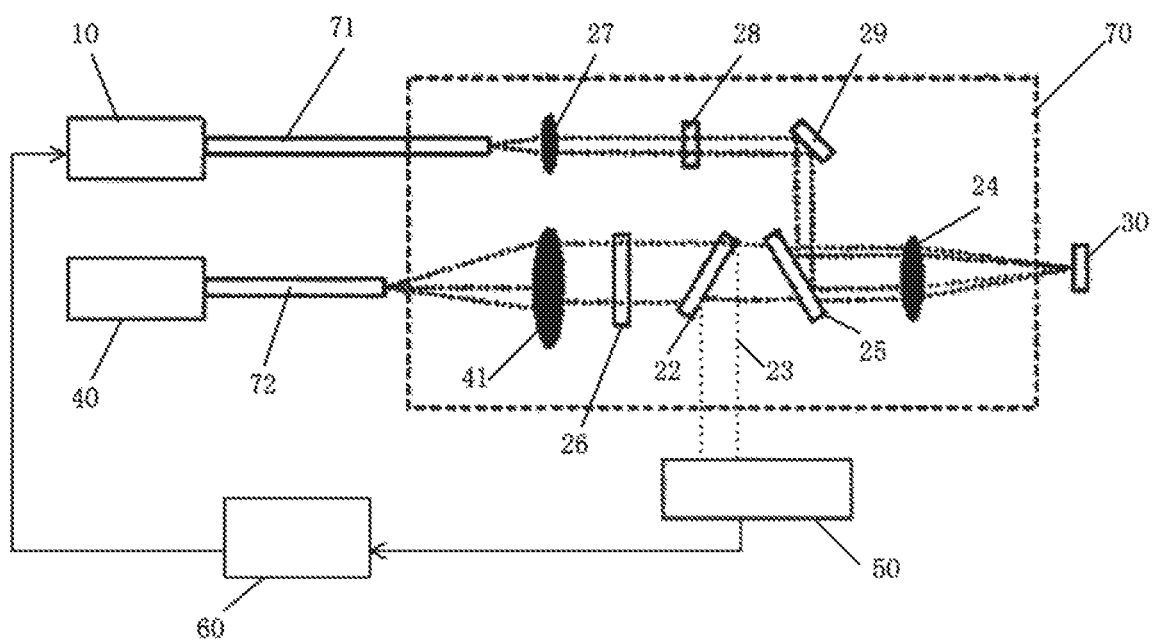
FIG. 5 is a schematic view showing a Raman spectrum inspection apparatus according to a still further embodiment of the present disclosure.

As shown in FIG. 5, in an example, the Raman spectrum inspection apparatus 100e may further include a controller 60. The controller 60 is configured to receive the detection results of the security detector 50 and send a control signal to the laser device 10. The controller 60 may be configured to reduce power of the laser device 10 or switch off the laser device 10 when the radiation energy of the infrared light detected by the security detector 50 exceeds a predetermined threshold. As an example, there is a correspondence relation between the temperature of the object 30 and the radiation energy of the infrared light emitted by the object 30, thus the predetermined threshold of the radiation energy of the infrared light set in the controller 60 may correspond to a temperature value not greater than the maximum permissible temperature of the object 30, so as to prevent the object 30 from being destroyed due to high temperature. The controller 60 may be implemented by components such as an integrated circuit, a signal processor, a computer or the like.

As an example, the optical device 20 may be integrated in an optical fiber probe 70. The exciting light 11 emitted by the laser device 10 may be guided into the optical fiber probe 70 by a guiding optical fiber 71. The optical fiber probe 70 transmits the collected Raman scattering light signal by a collection optical fiber 72 to the spectrometer 40. Certainly, the optical device 20 may also be constructed by separate optical elements. However, the optical fiber probe 70 may improve stability of the system.

As an example, the exciting light may also pass through a collimating lens 27 and a narrow band optical filter 28 before arriving at the second beam splitter 25 or the first converging lens 24. The collimating lens 27 may convert the exciting light into a substantially parallel light beam to improve directivity and optical efficiency. The narrow band optical filter 28 may remove disturbance to enhance the signal to noise ratio of the exciting light in a desired waveband. As an example, in order to fold the optical path, one or more deflecting mirrors 29 may also be arranged. As an example, in order that the Raman scattering light signal can better be coupled into the spectrometer 40, the second converging lens 41 may further be arranged upstream of the collection optical fiber 72.

Figure 6:
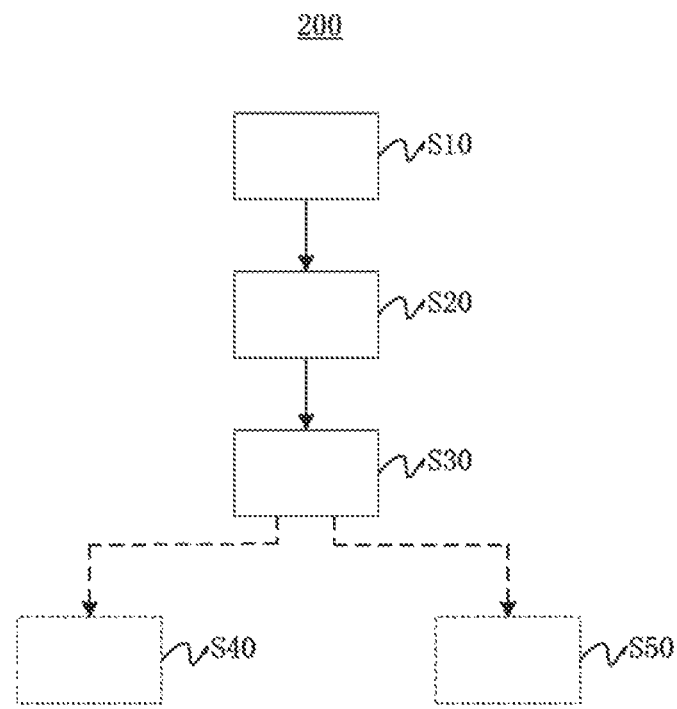
FIG. 6 is a flow chart of a security monitoring method for a Raman spectrum inspection apparatus according to an embodiment of the present disclosure.

An embodiment of the present disclosure also provides a security monitoring method 200 for a Raman spectrum inspection apparatus. As shown in FIG. 6, the security monitoring method 200 may include:

Step S10: emitting an exciting light by a laser device;

Step S20: guiding the exciting light to an object to be detected and collecting a Raman scattering light signal from the object; and Step S30: detecting radiation energy of an infrared light emitted from the object by a security detector to monitor temperature of the object.

The method may be used to monitor the temperature of the object to be detected when the Raman spectrum inspection apparatus works.

As an example, the security monitoring method 200 may further include:

Step S40: reducing power of the laser device or switching off the laser device when the temperature of the object is greater than a predetermined threshold.

The step S40 may be used to monitor whether the temperature of the object is greater than the predetermined threshold (the predetermined threshold may for example be 80 Celsius degrees, 100 Celsius degrees, 150 Celsius degrees, or the like, and may be determined depending on the object 30) in real-time when the Raman spectrum inspection apparatus works, so as to ensure security of the detection work.

As an example, the monitoring method 200 may further include:

Step S50: switching off the laser device after the laser device emits the exciting light for a predetermined period, and determining security of the object according to variation of temperature of the object in the predetermined period.

The step S50 may be used to estimate security of the detection before the Raman spectrum detection operation is regularly carried out. The predetermined period may for example be 0.5 second, 1 second, 3 second, or the like. If it is estimated that the temperature of the object may be too high, Raman inspection parameters (for example laser power, position of the object to be detected, or the like) may be controlled deliberately, so as to avoid security risk in regular inspection.

In the embodiments of the present disclosure, any one of the step S40 and step S50 may be used separately, or they may be used in combination. The dashed parts in FIG. 6 represent optional steps.

By means of the Raman spectrum inspection apparatus and the monitoring method according to the above embodiments, it can prevent security problem due to damage of an object caused by high temperature during Raman spectrum inspection.

The above description has explained various embodiments of the above Raman spectrum inspection apparatus and monitoring method thereof by schematic views, flow charts and/or examples. In case that the schematic views, flow charts and/or examples each include one or more functions and/or operations, the skilled person in the art should understand that each function and/or operation in such schematic views, flow charts and/or examples may be implemented separately and/or collectively by various structures, hardware, software, firmware or any combination of them in essential. In an embodiment, some parts of the subject of the embodiment of the present disclosure may be implemented by Application Specific Integrated Circuits (ASIC), Field Programmable Gate Arrays (FPGA), Digital Signal Processors (DSP) or other integrated forms. However, the skilled person in the art should understand that some aspects of the embodiments disclosed herein may be implemented equally in the integrated circuit entirely or partly, implemented as one or more computer programs running on one or more computers (for example, implemented as one or more programs running on one or more computer systems), implemented as one or more programs running on one or more processors (for example, implemented as one or more programs running on one or more microprocessors), implemented as firmware, or implemented as any combination of the above methods in essential. From the present disclosure, the skilled person in the art has capability of designing circuits and/or writing software and/or firmware codes. Furthermore, the skilled person in the art will appreciate that the mechanism of the subject of the present disclosure may be delivered as various forms of program products, and the exemplified embodiments of the subject of the present disclosure may be applicable independent of the specific types of the signal carrying media that perform the delivery in practice. Examples of the signal carrying media include, but not limited to: recordable media, such as a floppy disc, a hard disk drive, an optical disc (CD, DVD), a digital magnetic tape, a computer memory or the like; and transmission media such as digital and/or analogue communication media (for example, an optical fiber cable, a wave guide, a wired communication link, a wireless communication link or the like).

All of the above embodiments of the present disclosure may be combined freely to form other embodiments unless there are technical obstacles or contradictions. All of these other embodiments fall within the protection scope of the present disclosure.

Although the present disclosure has been explained with reference to the drawings, the embodiments shown in the drawings are only illustrative, instead of limiting the present disclosure. Scales in the drawings are only illustrative, instead of limiting the present disclosure.

Although some embodiments of the general inventive concept are illustrated and explained, it would be appreciated by those skilled in the art that modifications and variations may be made in these embodiments without departing from the principles and spirit of the general inventive concept of the present disclosure, the scope of which is defined in the appended claims and their equivalents.

What is claimed is:

1. A Raman spectrum inspection apparatus, comprising:
a laser device configured to emit an exciting light;
an optical device configured to guide the exciting light to an object to be detected and collect a light signal from the object;
a spectrometer configured to split the collected light signal to generate a Raman spectrum of the object; and
a security detector configured to detect an infrared light emitted from the object,
wherein the optical device further comprises:
a Raman scattering light signal collection optical path configured to collect the light signal from the object, and
an infrared light collection optical path configured to collect the infrared light from the object,
wherein the infrared light collection optical path is separated completely from the Raman scattering light signal collection optical path.

2. The Raman spectrum inspection apparatus of claim 1, wherein the first beam splitter is a short dichroic beam splitter arranged to reflect the light having a wavelength greater than a predetermined wavelength towards the security detector while transmitting the light having a wavelength less than the predetermined wavelength through the short pass dichroic beam splitter, and wherein the predetermined wavelength is in a range between 700 nanometers and 300 micrometers.

3. The Raman spectrum inspection apparatus of claim 1, wherein the first beam splitter is arranged to reflect a part of the light signal towards the security detector while transmitting another part of the light signal towards the spectrometer.

4. The Raman spectrum inspection apparatus of claim 1, wherein the second beam splitter is a long pass dichroic beam splitter.

5. The Raman spectrum inspection apparatus of claim 1, wherein a long pass optical filter or a notch optical filter is arranged downstream of the first beam splitter in the Raman scattering light signal collection optical path and configured to filter out the Rayleigh scattering light in the light signal passing through the first beam splitter.

6. The Raman spectrum inspection apparatus of claim 1, wherein a long pass optical filter or a notch optical filter is arranged between the object and the spectrometer in the Raman scattering light signal collection optical path and configured to filter out the Rayleigh scattering light in the light signal.

7. The Raman spectrum inspection apparatus of claim 1, further comprising a controller configured to receive detection results of the security detector and send a control signal to the laser device, and the controller is configured to reduce power of the laser device or switch off the laser device when the radiation energy of the infrared light detected by the security detector exceeds a predetermined threshold.

8. The Raman spectrum inspection apparatus of claim 2, further comprising a controller configured to receive detection results of the security detector and send a control signal to the laser device, and the controller is configured to reduce power of the laser device or switch off the laser device when the radiation energy of the infrared light detected by the security detector exceeds a predetermined threshold.

9. The Raman spectrum inspection apparatus of claim 3, further comprising a controller configured to receive detection results of the security detector and send a control signal to the laser device, and the controller is configured to reduce power of the laser device or switch off the laser device when the radiation energy of the infrared light detected by the security detector exceeds a predetermined threshold.

10. The Raman spectrum inspection apparatus of claim 1, wherein the optical device is integrated in an optical fiber probe, and the exciting light emitted by the laser device is guided into the optical fiber probe by a guiding optical fiber, and the optical fiber probe transmits the collected Raman scattering light signal by a collection optical fiber to the spectrometer.

11. The Raman spectrum inspection apparatus of claim 2, wherein the optical device is integrated in an optical fiber probe, and the exciting light emitted by the laser device is guided into the optical fiber probe by a guiding optical fiber, and the optical fiber probe transmits the collected Raman scattering light signal by a collection optical fiber to the spectrometer.

12. The Raman spectrum inspection apparatus of claim 3, wherein the optical device is integrated in an optical fiber probe, and the exciting light emitted by the laser device is guided into the optical fiber probe by a guiding optical fiber, and the optical fiber probe transmits the collected Raman scattering light signal by a collection optical fiber to the spectrometer.

13. A security monitoring method for a Raman spectrum inspection apparatus using the Raman spectrum inspection apparatus of claim 1, the method comprising:
    emitting an exciting light by a laser device;
    guiding the exciting light to an object to be detected and collecting a Raman scattering light signal from the object; and
    detecting radiation energy of an infrared light emitted from the object to monitor temperature of the object.

14. The security monitoring method of claim 13, further comprising:
    reducing power of the laser device or switching off the laser device when the temperature of the object is greater than a predetermined threshold.

15. The security monitoring method of claim 13, further comprising:
    switching off the laser device after the laser device emits the exciting light for a predetermined period, and determining security of the object on a basis of variation of temperature of the object in the predetermined period.

* * * * *